United States Patent [19]
Falls

[11] Patent Number: 5,076,202
[45] Date of Patent: Dec. 31, 1991

[54] AUTOMATIC CAR WAXER

[76] Inventor: John W. Falls, 2700 Brook Bridge Cv., Germantown, Tenn. 38138

[21] Appl. No.: 541,726

[22] Filed: Jun. 21, 1990

[51] Int. Cl.⁵ .......................... B05C 1/02; B60S 3/06
[52] U.S. Cl. ................................. 118/669; 118/677;
  118/686; 118/58; 118/109; 118/110; 118/244;
  118/258
[58] Field of Search ............... 15/53.3, 97.3; 118/73,
  118/206, 209, 58, 62, 100, 110, 111, 200, 210,
  241, 258, 264, 223, 224, 225, 256, 244, 239, 676,
  677, 679, 687, 696, 704, 708, 56, 58, 64, 223,
  240, 242, 669, 686, 109; 104/162, 172.3;
  198/733

[56] References Cited

U.S. PATENT DOCUMENTS

| | | | |
|---|---|---|---|
| 3,035,293 | 5/1962 | Larson | 15/53.3 |
| 3,037,223 | 6/1962 | Lovsey | 15/53.3 |
| 3,224,108 | 12/1965 | Flaming | 118/704 |
| 3,241,167 | 3/1966 | Murillo et al. | 15/53.3 |
| 3,447,505 | 6/1969 | Wagner | 118/704 |
| 4,020,857 | 5/1977 | Rendemonti | 134/7 |
| 4,051,806 | 10/1977 | Hanna | 118/73 |
| 4,441,226 | 4/1984 | Hanna | 15/53.3 |
| 4,445,246 | 5/1984 | Hanna | 15/53.3 |
| 4,530,126 | 7/1985 | Belanger | 15/53.3 |
| 4,622,246 | 11/1986 | Takeuchi | 427/327 |
| 4,781,946 | 11/1988 | Takeuchi | 427/327 |

Primary Examiner—Willard E. Hoag
Attorney, Agent, or Firm—Walker & McKenzie

[57] ABSTRACT

An apparatus for waxing vehicles for use in conjunction with commercial "car wash" operations. Vehicles are transported by a chain driven conveyor mechanism through a wax application station, passed to a second conveyor mechanism for movement through a drying station, and on to a third conveyor mechanism for passage through a polishing station. A computer system controls the waxing process and operates various pneumatic positioning devices, positioning wax application heads, drying blowers, and polishing heads adjacent the vehicle, a using knowledge of the size, shape, and dimensional parameters of the vehicle. These parameters are stored within the computer system according to manufacturer, model, and year, specified when the vehicle enters the apparatus. Wax application heads used in the wax application station and polishing heads used in the polishing station operate in a circular pressure-sensitive manner resembling the hand orbital waxing motion used to manually wax a car, and air cylinders on each head drive a rotating-translating shaft which urges the head against the car. The wax application heads have removable porous pads over a grooved rubber mandrel head, and apply liquid wax flowing in the grooves to the car. Electromagnetic sensors located on each wax application head inhibit the application of wax to non-metallic areas of the car by inhibiting the flow of wax and causing the head to retract from the vehicle. The polishing or buffing heads are similar, but apply to wax.

9 Claims, 6 Drawing Sheets

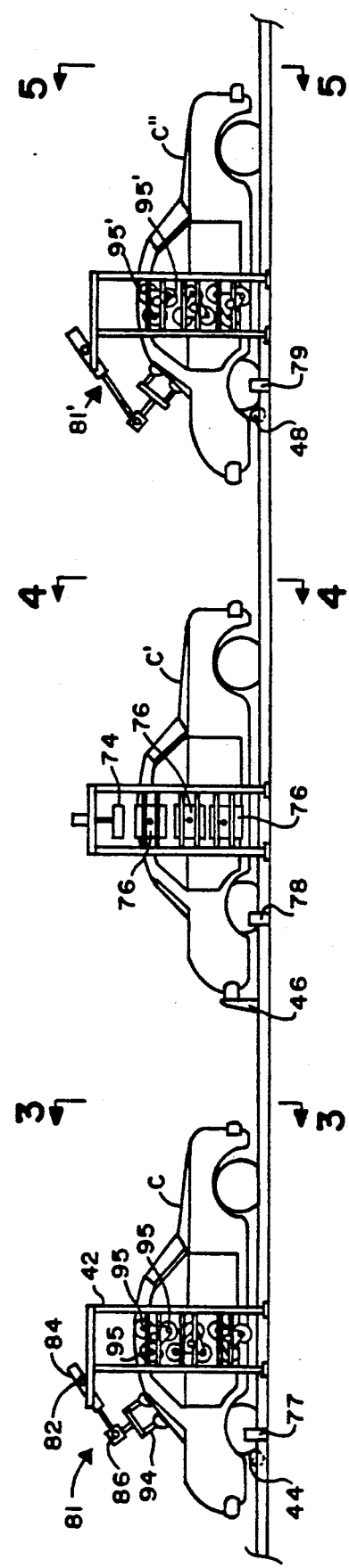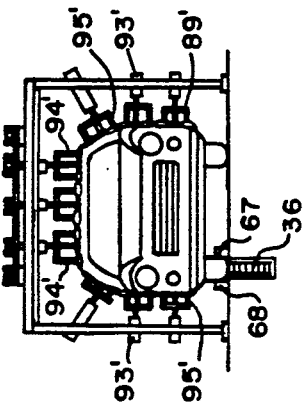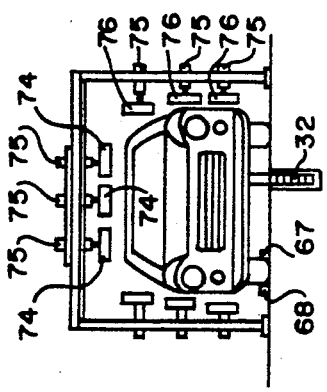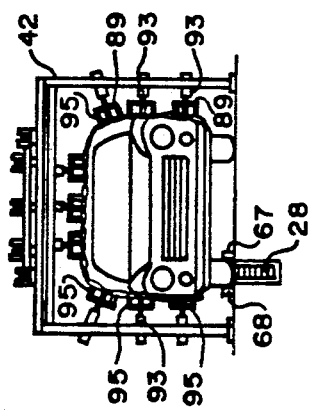

AUTOMATIC CAR WAXER

BACKGROUND OF THE INVENTION

1. Field of the Invention

The present invention relates, in general, to apparatus for the automatic waxing of vehicles, and particularly to an apparatus for waxing automobiles, trucks, and vans in commercial "car wash" operations.

2. Information Disclosure Statement

A preliminary patentability search in class 427, subclasses 327 and 416, produced the following patents: Rendemonti, U.S. Pat. No. 4,020,857, issued May 3, 1977; Takeuchi, U.S. Pat. No. 4,622,246, issued Nov. 11, 1986; and Takeuchi, U.S. Pat. No. 4,781,946, issued Nov. 1, 1988. While each of the above patents disclose various apparatus for polishing and waxing automobiles, none disclose or suggest the present invention.

More specifically, none of the above patents disclose or suggest an automatic vehicle waxer, for applying a hand waxing effect to a vehicle, comprising: a wax application station, comprising a wax application head means which operates in a circular pressure-sensitive basis for applying wax to the vehicle, and a first positioning means for positioning the wax application head means adjacent the surface of the vehicle; a drying station, comprising a blower for drying the wax applied by the wax application head means; a polishing station, comprising a polishing head means which operates in a circular pressure-sensitive basis for polishing the wax dried by the blowing station, and a second positioning means for positioning the polishing head means adjacent the surface of the vehicle; a first conveyor means for moving the vehicle through the wax application station to a first pick-up point; a second conveyor means for moving the vehicle from the first pick-up point, through the drying station to a second pick-up point; and a third conveyor means for moving the vehicle from the second pick-up point through the polishing station.

Rendemonti, U.S. Pat. No. 4,020,857, describes an apparatus and method for pressure cleaning and waxing automobiles in which microcrystalline beads of dry, water soluble, carnauba wax are blasted against the surfaces of the atuomobiles with sufficient pressure to cause fricitional buffing and polishing of the surfaces, without any mechanical buffing or polishing. The Rendemonti patent does not achieve a hand waxing effect, since it lacks the wax application head means and polishing head means of the present invention which operate in a circular pressure-sensitive basis; in fact, Rendemonti teaches against the use of mechanical buffing or polishing, while the present invention uses such mechanical buffing or polishing to achieve the aforementioned hand waxing effect.

Takeuchi, U.S. Pat. No. 4,622,246 describes a method of polishing a vehicle using a traveling frame which straddles a vehicle to be polished, using rotating brushes to polish a foamy wax of anionic active agent which has been sprayed upon the vehicle, followed by application of an aqueous wax of cationic active agent, which is also polished, and then dried. The U.S. Pat. No. 4,622,246 patent uses brushes, unlike the current invention, which uses a wax application head and polishing head, and does not achieve the hand waxed effect attributable to the circular pressure-sensitive motion of the present invention's wax application and polishing heads. Additionally, since the vehicle in the U.S. Pat. No. 4,622,246 patent is stationary, with a traveling waxing frame, the throughput of the waxing apparatus is reduced as contrasted with the present invention, which is more suited to volume waxing of a large number of vehicles due to the "assembly-line" approach of multiple conveyor means and separate wax application, drying, and polishing stations.

Takeuchi, U.S. Pat. No. 4,781,946, is similar to the earlier Takeuchi patent mentioned above, also having a traveling frame and rotary polishing brushes, and also uses a treatment of foamy anionic surfactant followed by a treatment of a cationic surfactant containing aqueous wax. The present invention has no such polishing brushes, no such traveling frame, and uses no such anionic and cationic surfactants. Because both Takeuchi patents use brushes to polish wax which has been sprayed upon the vehicle, they achieve a "brush waxed" effect, as opposed to the "hand waxed" effect achieved by the present invention.

SUMMARY OF THE INVENTION

It is an object of the present invention to provide an apparatus for applying an orbital hand waxing effect to vehicles, such as cars, trucks, and vans, for use in conjunction with automated car wash systems. This invention does not require the use of water in the waxing process, and does not spray a wax solution onto the vehicle, but waxes the car using a wax application head means which applies liquid wax, as well as a polishing head means, both operating in a circular pressure-sensitive manner to achieve the orbital hand waxing effect that is an object of this invention. It will be understood that the phrase "circular pressure-sensitive," as used herein to describe the operation of the wax application head means and polishing head means, refers to the waxing motion of the wax applicator head or polishing head, respectively, as it is urged against the surface of the vehicle in a manner that allows application of wax or buffing thereof, but without such excess force as might damage the paint or finish of the vehicle, in a manner resembling the hand orbital waxing motion used to manually wax a car, as will become apparent in the description of this invention. It will also be understood that the circular pressure-sensitive motion of the wax application head means and polishing head means may be of an orbital nature, using conventional techniques well known to those skilled in the art.

It is a further object to perform the waxing process on an automated assembly line basis within a time comparable to that required by a traditional automatic car wash system, thus allowing the present invention to be used in conjunction with such an automatic car wash system.

The present invention is intended to be adaptable to the various sizes, shapes, and models of vehicles commonly in use by means of control means which adapt the waxing equipment according to the manufacturer, model, and year of the vehicle to be waxed. The present invention is also capable of substantially inhibiting the application of wax upon non-metallic portions of the vehicle surface, such as windows and rubber bumpers, for a more aesthetically pleasing result.

Additionally, it is an object of the present invention that the wax application pads used by the wax application head means, as well as the buffing pads used by the polishing head means, be easily replaceable to facilitate quick changing as may be periodically required.

BRIEF DESCRIPTION OF THE DRAWINGS

FIG. 2 is a side elevational view of the car waxer. FIGS. 3, 4, and 5 are front elevational views of the wax application station, the drying station, and the polishing station, respectively, taken substantially along lines 3—3, 4—4, and 5—5, respectively, shown in FIG. 2.

DESCRIPTION OF THE PREFERRED EMBODIMENT

Figure 1:
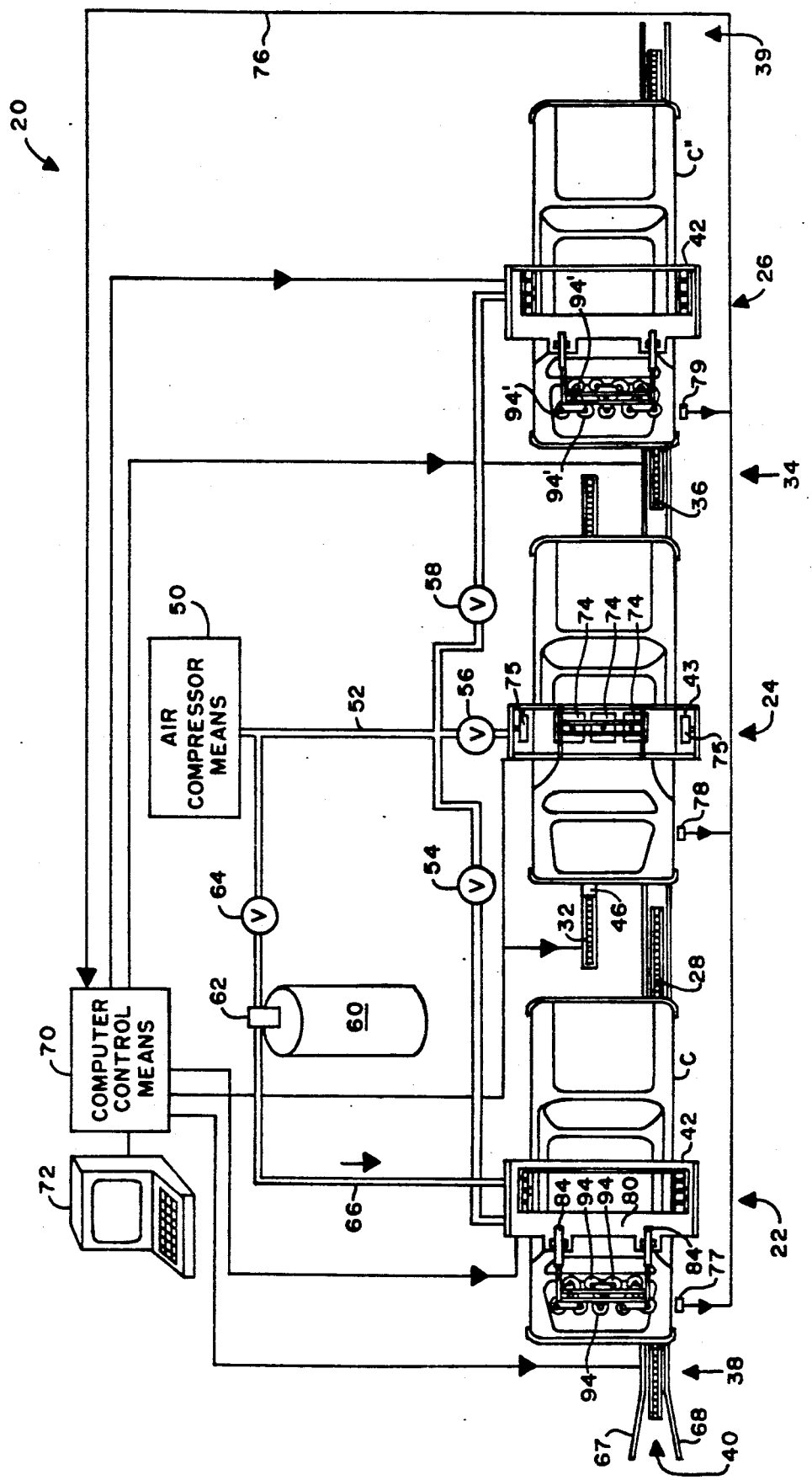
FIG. 1 is a diagram of the automatic car waxer showing the interconnection of the various elements, as well as a top view of vehicles being waxed.

Referring to FIG. 1, the automatic vehicle waxer 20 comprises a wax application station 22, a drying station 24, and a polishing station 26. Vehicles, such as car C, C', and C'', are guided through the automatic vehicle waxer on wheel guide track 40 by a conveyor system, such as first conveyor means 28, second conveyor means 32, and third conveyor means 36, all well known to those skilled in the art. Each of the first, second, and third conveyor means may employ a conventional chain drive mechanism, and each urges the vehicle forward using, for instance, pusher means, such as well known wheel rollers 44 and 48 on first and third conveyor means 28 and 36, respectively, as shown in FIG. 2, or pusher arms, such as rubber pusher arm 46 shown on second conveyor means 32. Each of the three conveyor means operates independently to accommodate the differing requirements of the wax application, drying, and polishing stations, in a manner that will soon become apparent.

The first conveyor means 28 moves a vehicle, such as car C, from an entry point 38 of the automatic vehicle waxer, through the wax application station 22, to a first pick-up point 30, where the pusher means, such as wheel rollers 44, will disengage, pass under the wax application station as shown in FIG. 3, and return to the entry point 38 for receipt of another vehicle, all in a manner well known to those skilled in the art.

The second conveyor means 32 operates independently in a similar manner, moving a vehicle, such as car C', from the first pick-up point 30, through the drying station, to a second pick-up point 34.

Likewise, third conveyor means 36 moves a vehicle, such as car C'', from second pick-up point 34, through the polishing station 26, to the exit point 39 of the automatic vehicle waxer, where the vehicle may be driven to a location for manual touch-up of any areas missed by the automatic waxing process and cleaning of the windows of the vehicle, if necessary.

As seen in FIG. 1, the path of travel of first conveyor means 28 overlaps the path of travel of second conveyor means 32, allowing transfer of the vehicle, such as car C, as it passes from the wax application station 22 to the drying station 24, at first pick-up point 30. Similarly, the path of travel of second conveyor means 32 overlaps the path of travel of third conveyor means 36, allowing transfer of the vehicle, such as car C', as it passes from the drying station to the polishing station.

Automatic vehicle waxer 20 also comprises air compressor means 50, well known to those skilled in the art, supplying air through air supply line 52 to pneumatic actuators in the wax application, drying, and polishing stations as will be described herein, regulated by regulating valves 54, 56, and 58 in air supply line 52 in the usual manner. Liquid wax is provided to the wax application station from wax storage tank 60 through main wax supply line 66 by pump means, such as pneumatic pump 62, powered by air compressor means 50 regulated through regulating valve 64, in a manner well known to those skilled in the art.

Operation of automatic vehicle waxer 20 is coordinated by a control means, such as computer control means 70. In the preferred embodiment, computer control means 70 will include data storage means, well known to those skilled in the art, containing the various size, shape, and dimensional parameters of common vehicles, arranged by manufacturer, model, and year, and will receive the manufacturer, model, and year of the vehicle to be waxed through input device means, such as a portable control unit or keypad (not shown) or computer terminal 72. Computer control means 70 receives, as a reference, the location of each vehicle as it passes through the automatic car waxer on the conveyor system by signals over signal transmission means 76 from position sensors 77, 78, and 79, located adjacent the wax application, drying, and polishing stations, respectively. Position sensors 77, 78, and 79 may be optical, electromechanical, or preferably electromagnetic sensors, all well known to those skilled in the art, and provide a reference point for the computer control means, which, knowing and controlling the movement of conveyor means 28, 32, and 36, along with the size, shape, and dimensional parameters of the vehicle being waxed, may compute the spatial location of the vehicle outline as it passes through the waxer 20, in a manner that will be apparent to those skilled in the art. In the preferred embodiment, computer control means 70 may also control pneumatic cylinders, not shown, attached to guide rails 67 and 68 of wheel guide track 40, adjusting the width of guide track 40 in accordance with the tire size of the vehicle as determined by the manufacturer, model, and year of the vehicle, previously input to computer control means 70, as required for proper alignment and guidance of the vehicle through the automatic waxer 20, as will now be apparent.

Upon entering the automatic vehicle waxer 20, a vehicle, such as car C, first passes through the wax application station 22. Referring to FIG. 1, 2, and 3, wax application station 22 is seen to comprise a main frame 42 which includes a transverse frame member 80 over the path of travel of car C. The wax application station is also seen to comprise one or more wax application head assemblies, such as head assemblies 94 and 95, which apply liquid wax, supplied by main wax supply line 66, to the surface of the vehicle in a manner that will be described below. As seen in FIG. 2 and 3, some head assemblies 95 are arranged to apply wax to the sides of car C, while others, such as head assemblies 94, are arranged to apply wax to the front, top, and rear of car C, in a manner that will soon become apparent. The construction and operation of head assemblies 94 and 95 is similar; only head assembly 94 will be described in detail.

Figure 15:
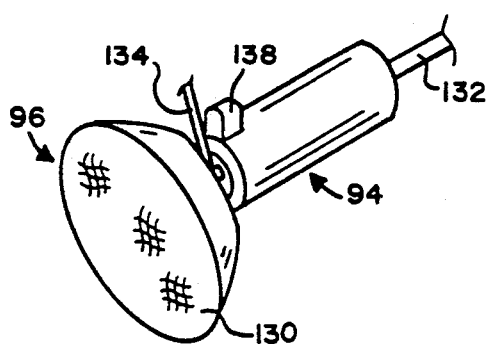
FIG. 15 is a perspective view of the wax application head assembly.
Figure 16:
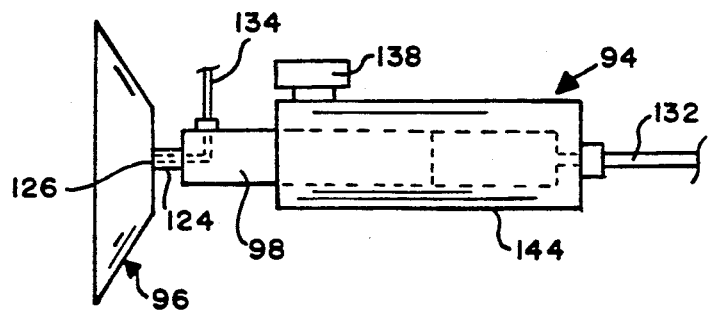
FIG. 16 is a side view of the wax application head assembly.

Referring to FIG. 15 and 16, head assembly 94 comprises a head means 96 and means for operating head means 96 in a circular pressure-sensitive manner, such as rotating-translating shaft 98, powered by flexible air supply line 132, in a manner well known to those skilled in the art. It will be understood that the phrase "circular pressure-sensitive," as used herein, describes the operation of head means 96, and refers to the waxing motion of the head as it is urged against the surface of the vehicle by shaft 98 in a manner that allows application of wax, but without such excess force as might damage the paint or finish of the vehicle, in a manner resembling the hand orbital waxing motion used to manually wax a car, as will become apparent. It will also be understood that the circular pressure-sensitive motion of head means 96 may be of an orbital nature, using conventional techniques well known to those skilled in the art, operating in a circular pressure-sensitive manner to achieve the orbital hand waxing effect that is an object of this invention.

Figure 14:
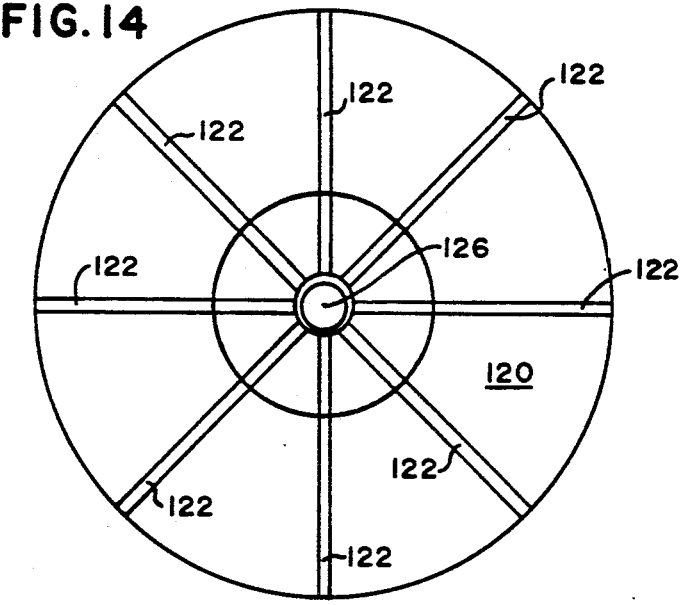
FIG. 14 is a front view of the rubber mandrel head used in the wax application head assembly, with the wax application pad removed.
Figure 17:
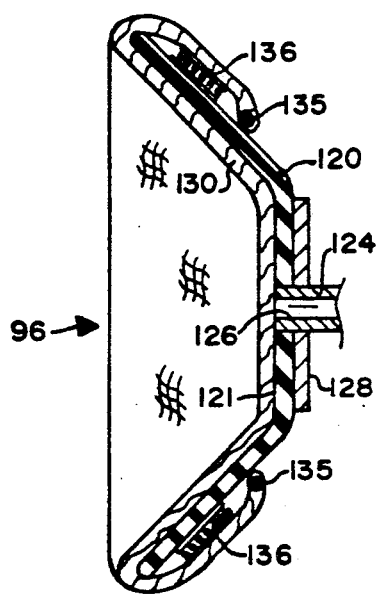
FIG. 17 is a sectional view of the rubber mandrel head used in the wax application head assembly, with the wax application pad attached, taken along a diameter of the mandrel head.

Head assembly 94 may be fixedly attached to head support frame 92 by any suitable means, not shown, well known to those skilled in the art, allowing translating movement to accommodate the contours of car C. Referring to FIG. 16 and 17, head means 96 comprises a concave rubber mandrel head 120 mounted on hollow mounting shaft 124 of rotating-translating shaft 98 using support means, such as washer plate 128, in a manner well known to those skilled in the art. One end of mounting shaft 124 protrudes through the concave surface 121 of mandrel head 120, exposing opening 126 at one end of shaft 124 through which liquid wax, flowing through secondary wax supply line 134 and hollow mounting shaft 124, is pumped for application onto the vehicle being waxed. Wax application head means 96 also comprises a porous wax application pad 130 which fits over mandrel head 120; in the preferred embodiment, pad 130 is secured to head 120 by elastic band 135 and "Velcro"-type attachments 136, well known to those skilled in the art, allowing application pad 130 to be quickly and easily changed as required. Referring to FIG. 14, showing a front view of the concave end of mandrel head 120, the mandrel head is seen to have grooves 122 extending outwardly from opening 126 in shaft 124 for receipt of wax emerging from opening 126. The centrifugal force from the rotation of head 120, as it moves in its circular pressure-sensitive manner, propels wax emerging from opening 126 outwardly toward the circumference of head 120. The wax then flows through the porous wax application pad 130 and onto the vehicle.

Referring to FIG. 15 and 16, head assembly 94 is seen to comprise a sensing means, such as electromagnetic sensor 138, for sensing whether the surface of the vehicle adjacent head means 96 is substantially metallic or non-metallic, in a manner well known to those skilled in the art. If sensor 138 detects the presence of a substantially non-metallic surface portion, such as a window or rubber bumper, of the vehicle being waxed, it will cause the operation of a valve, not shown, in air supply line 132 to operate, thus causing rotating-translating shaft 98 to substantially retract, thus separating head means 96 from the surface of the vehicle. Sensor 138 also, when detecting the presence of the substantially non-metallic surface portion of the vehicle, shuts off the supply of wax to head means 96 by operating a valve, not shown, in wax supply line 134. Operating in the manner described above, this sensing means is seen to thus substantially inhibit the application of wax to non-metallic portions of the vehicle surface.

Figure 11:
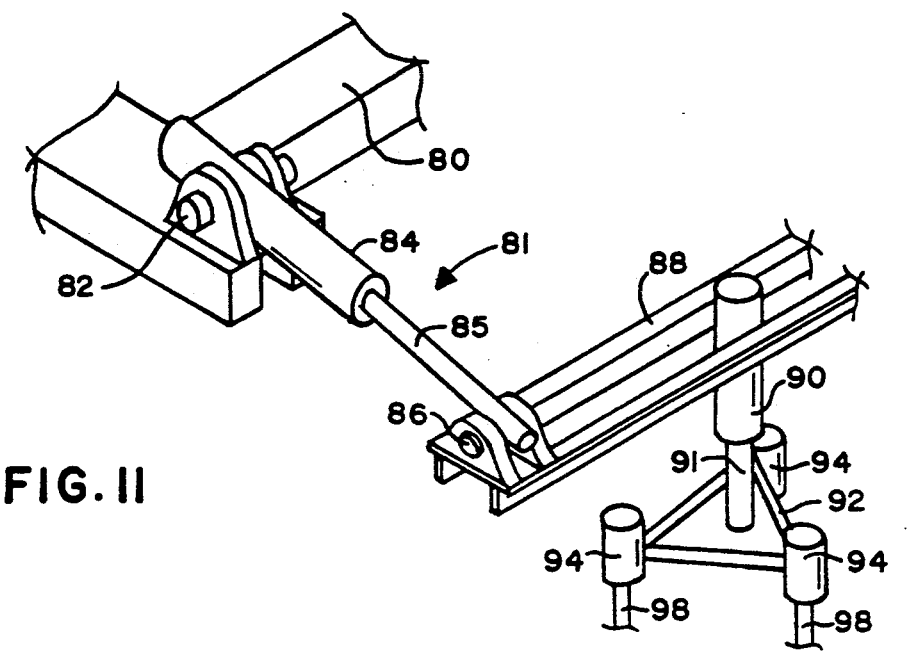
FIG. 11 is a view of the positioning means, showing the interconnection of various elements.

As previously described (and shown in FIG. 1), wax application station 22 comprises a main frame 42 which includes a transverse frame member 80 over the path of travel of car C. FIG. 11 shows the elements of positioning means, such as wax application station positioning means 81, attached to frame member 80, for positioning the head means adjacent the surface of the vehicle being waxed. Positioning means 81 is seen to comprise a first rotating cylinder means, such as pneumatic rotating cylinder 82, whose base is attached to transverse frame member 80, for adjusting the angular position of main pneumatic cylinder 84 with respect to main frame 42, in a manner that will be described herein. A second rotating cylinder means, such as pneumatic rotating cylinder 86, whose base is attached to support frame 88, similarly adjusts the angular position of main pneumatic cylinder 84 with respect to support frame 88. Main pneumatic cylinder 84, having opposite ends attached to rotating cylinders 82 and 86, operating in the well known manner, extends and retracts shaft 85, causing support frame 88 to be spaced a desired distance from frame member 80, as will now be apparent. Similarly, a secondary pneumatic cylinder means, such as secondary pneumatic cylinder 90, having opposite ends attached to support frame 88 and head support frame 92, extends and retracts shaft 91, causing support frame 88 to be spaced a desired distance from head support frame 92. In the preferred embodiment, a plurality, preferably three, head assemblies 94, previously described, are attached to head support frame 92.

Figure 12:
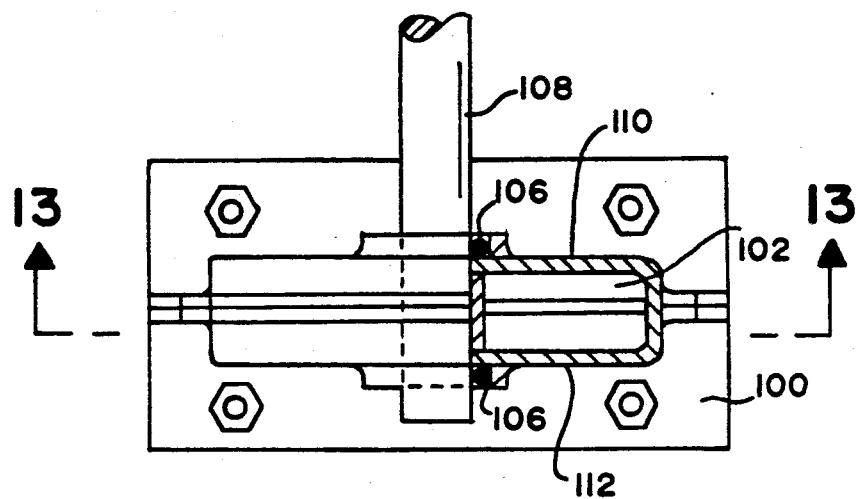
FIG. 12 is a top view and partial section of a pneumatic rotating cylinder used within the positioning means.
Figure 13:
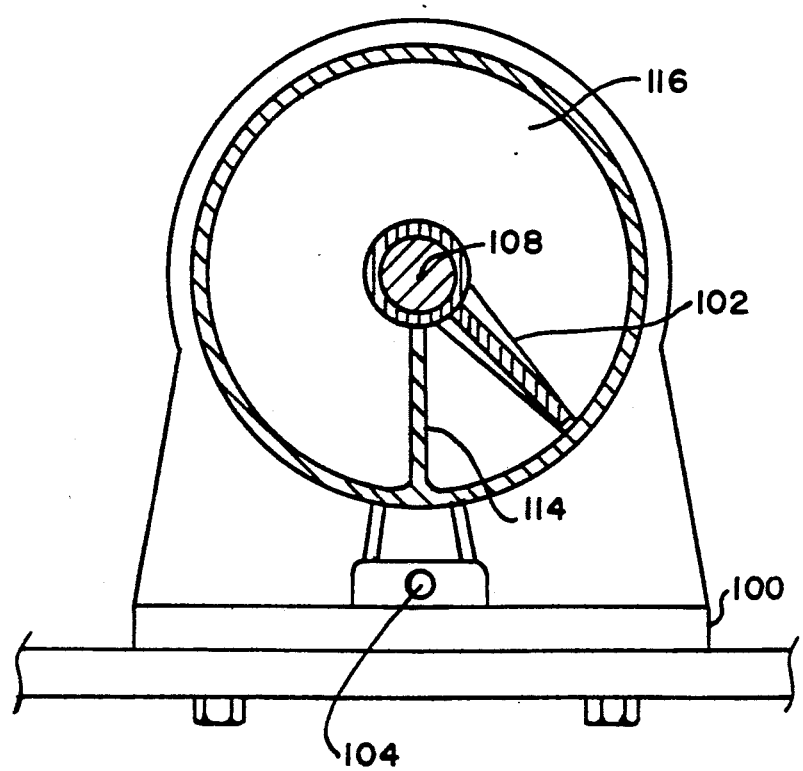
FIG. 13 is a sectional view of FIG. 12, taken along the line 13—13 as shown.

Referring to FIG. 12 and 13, the details of the preferred embodiment of the rotating cylinder means, such as pneumatic rotating cylinders 82 and 86, may be seen. The rotating cylinder is seen to comprise a base 100, a first housing side 110 and a second housing side 112. Housing sides 110 and 112 are shaped to form an interior cavity 116, substantially cylindrical in shape, partitioned along a radius by interior partition 114 as shown. Shaft 108 passes axially through housing sides 110 and 112, attached for rotational movement by means of bearings 106 in each housing side as shown. Movable vane 102, attached to and extending radially outward from shaft 108, is forced to move in a clockwise or counterclockwise direction by air entering through air inlet 104, directed by valves, not shown, to enter and exit on the right or left of partition 114, in a manner well known to those skilled in the art. As movable vane 102 is forced to move in a clockwise or counterclockwise direction, shaft 108 is caused to rotate. This rotation of shaft 108, of first and second pneumatic rotating cylinders 82 and 86, respectively attached to the ends of main pneumatic cylinder 84, is seen to vary the angular position of main pneumatic cylinder 84 with respect to both frame member 80 and support frame 88. This angular variation, together with the extension and retraction of shafts 85 and 91 of pneumatic cylinders 84 and 90, is thus observed to properly position head means 96 adjacent the surface of the vehicle as shown in FIG. 6 through 10 for various typical positions of car C, operating much as an elbow, forearm, and wrist do on a human to position one's hands. In the preferred embodiment, computer control means 70 controls these pneumatic cylinders, in a manner well known to those skilled in the art, using the model, year, and manufacturer of car C to compute the spatial outline of the car, determined by the size, shape, and dimensional parameters for the particular vehicle.

It may be noted in FIG. 1, 2, and 3 that lateral head assemblies 95, substantially similar to head assemblies 94, are mounted upon lateral head support frames 89, substantially similar to head support frames 92, previously described, which are attached to positioning means, such as pneumatic cylinders 93, mounted upon main frame 42, allowing wax to be applied to the sides of car C in a manner similar to that used by head assembly 94. Pneumatic cylinders 93 position lateral head assemblies 95 adjacent the side surfaces of the car as required by the particular model, year, and manufacturer of the car, preferably controlled by computer control means 70 in a manner to that similarly described above, as will now be apparent.

A predetermined air pressure, supplied by flexible air supply line 132, shown in FIG. 16, urges shaft 98 outwardly and therefore the head assembly 95 against the surface of car C in a manner that provides for proper application of wax from head means 96, but without such excess force as might damage the paint or finish of the vehicle. It will be noted that, since shaft 98 can move inwardly and outwardly, as required, within body 144 of head assembly 94, as shown in FIG. 16, and is urged outwardly to move the head assembly 95 against the surface of the vehicle by the aforementioned air pressure supplied by supply line 132, positioning tolerances of head assemblies 95 (and 94) with respect to the surface of the vehicle are substantially ameliorated, thus reducing the need for constant and precise positioning of the head assemblies by positioning means 81 and 93, as shown in FIG. 1 through 10.

Upon completion of the wax application process, the vehicle next enters the drying station 24, as shown in FIG. 1, 2, and 4, for drying of the wax applied in the wax application station. The drying station comprises drying means, such as heavy-duty transverse blowers 74 and heavy-duty lateral blowers 76 mounted within frame 43. Pneumatic cylinders 75 may be provided for positioning the blowers adjacent the surface of the vehicle, such as car C', as shown, all controlled preferably by computer control means 70 which, as previously discussed, is able to compute the spatial outline of the car. Alternately, without departing from the spirit and scope of the invention, the drying station may comprise a single transverse blower and lateral blowers, not shown, as commonly used in present car wash systems.

After the wax is dried in the drying station, the vehicle moves from the drying station into the polishing station 26. As noted in FIG. 1, 2, and 5, the polishing station is seen to be similar to the wax application station 22, having positioning means 81', substantially similar to positioning means 81, lateral head support frames 89', substantially similar to head support frames 89, and lateral positioning pneumatic cylinders 93', substantially similar to lateral positioning pneumatic cylinders 93. Operation of the polishing station is substantially the same as that of the wax application station, previously described, except that, rather than applying wax to the vehicle, such as car C", the wax, previously dried by the drying station, is polished and buffed. Polishing head assemblies 94' and 95', shown in FIG. 1, 2, and 5, are substantially similar to wax application head assemblies 94 and 95, respectively, shown in FIG. 14, 15, 16, and 17, except that the polishing head assemblies have no wax supply line, such as supply line 134, and the buffing pads used in polishing head assemblies 94' and 95', corresponding to wax application pads 130 of the wax application head assemblies, are non-porous, unlike the wax application pads, and also substantially thicker than the wax application pads, in order to facilitate polishing of the wax. Attachment of the buffing pad to the polishing head is preferably by means similar to elastic band 135 and "Velcro"-type attachments 136 used on the wax application head. Additionally, while the rubber mandrel heads used in the polishing head assemblies do not require grooves, such as grooves 122 in head 120, for wax, the same rubber mandrel head used in the wax application head means may be used for the polishing head means, giving a reduction in the variety of parts required for the vehicle waxer 20.

Figure 6:
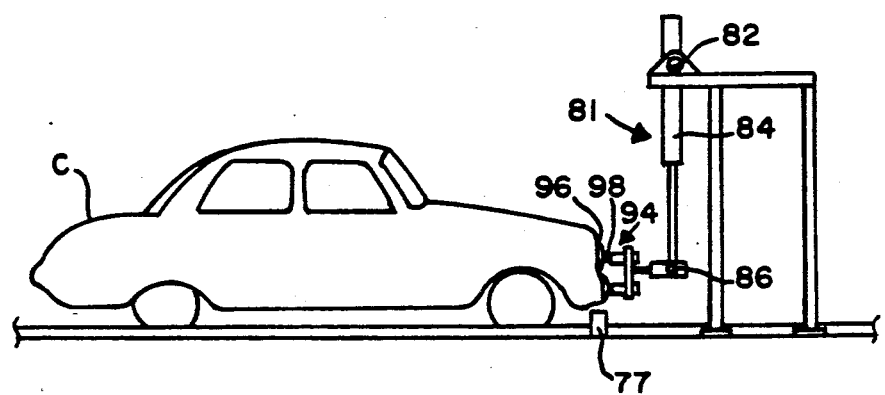
FIGS. 6, 7, 8, 9, and 10 are side views showing the operation of the positioning means used in the wax application station and the polishing station as a vehicle passes through each station.
Figure 7:
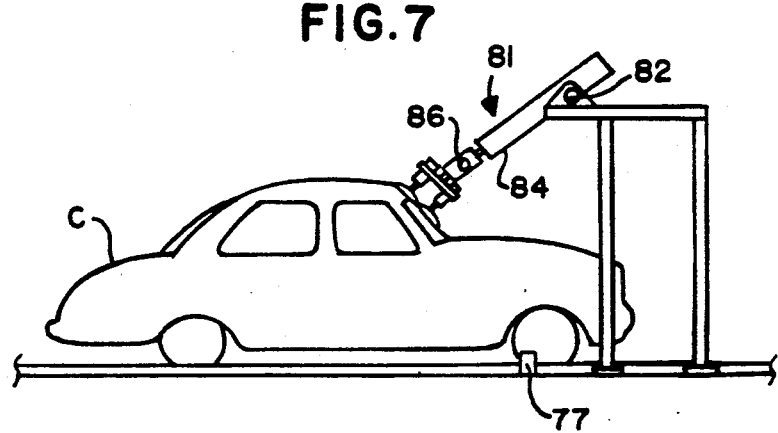
Figure 8:
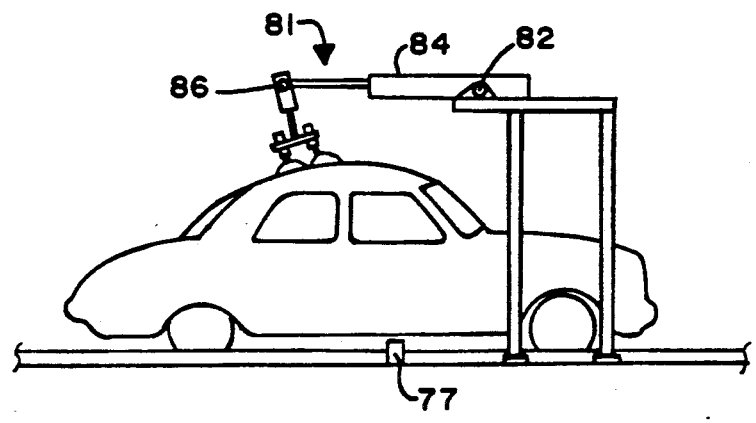
Figure 9:
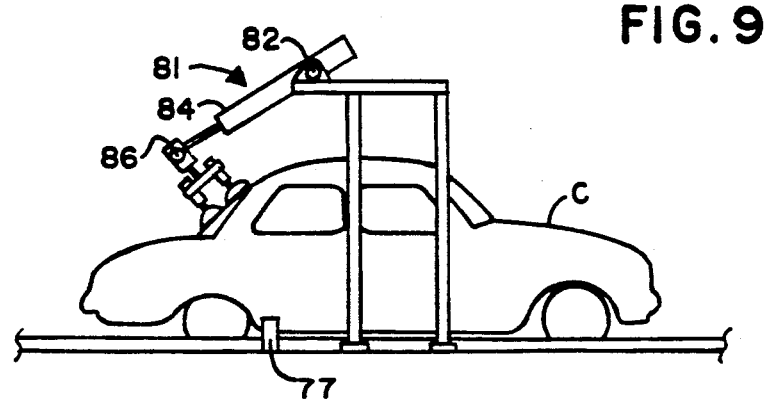
Figure 10:
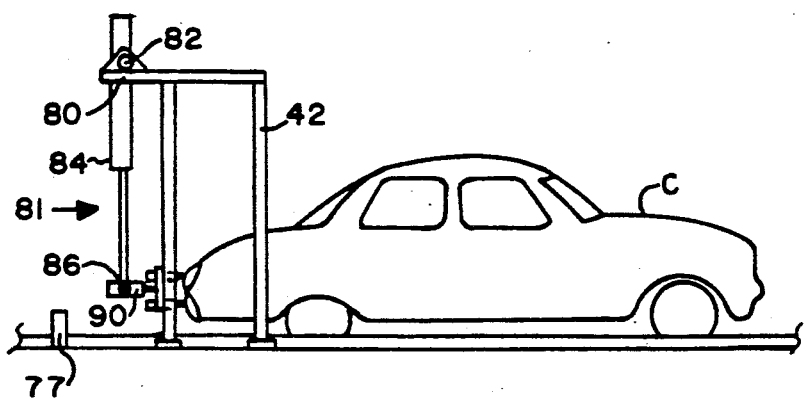

In the preferred embodiment, as a vehicle, such as car C, enters the automatic vehicle waxer, conveyor means 28 will move the car into waxing station 22. An operator will enter the proper manufacturer, model, and year of the car into computer control means 70 using an input means, such as computer terminal 72, and computer control means 70 will retrieve the size, shape, and dimensional parameters for the car. Computer control means 70 will establish a reference position of car C as the car is detected by position sensor 77. When the front of the car is properly positioned for waxing, control means 70 will stop the movement of conveyor means 28, properly control positioning means 81 to position head assemblies 94 adjacent the front of car C, in a manner well known to those skilled in the art, as required by the size, shape, and dimensional parameters of car C, cause head means 96 to be urged against the surface of the car by shaft 98, and waxing of the front of the car will begin, as shown in FIG. 6. Substantially metallic surfaces of the car will have wax applied to them in a manner previously described. Computer control means 70 will cause positioning means 81 to move head assembly 94 upwardly, waxing the front surfaces of the car, as determined by the retrieved parameters for the particular vehicle, and after the front of the car has been waxed, will cause conveyor means 28 to begin moving the car forward. At this point, control means 70 will engage the lateral head assemblies 95, shown in FIG. 3, and properly cause positioning means 81 to move head assembly 94 across the hood, top, and trunk of car C, as shown in FIG. 7 through 9, in a manner well known to those skilled in the art, using the size, shape, and dimensional parameters of the vehicle, along with knowledge of the controlled motion of conveyor means 28, to compute the spatial outline of the car as it passes through waxing station 22. When the sides and trunk of the car have been waxed, and the rear of the car is properly positioned for waxing, control means 70 will again halt conveyor means 28, and the rear of the car will be waxed, in a manner similar to that used for the front of the car, as shown in FIG. 10. When the rear of the car has been waxed, control means 70 will cause conveyor means 28 to move the vehicle to a first pick-up point 30, shown in FIG. 1, to await transport into the drying station.

When the drying station becomes available, control means 70 will cause conveyor means 32 to transport the vehicle through drying station 24, establishing a reference position for the vehicle as it passes position sensor 78. Control means 70 will properly adjust the position of blowers 74 and 75 according to the size, shape, and dimensional parameters of the vehicle as it passes through the drying station, as shown in FIG. 2 and 4, in a manner well known to those skilled in the art, to properly dry the wax applied by the wax application station. When the car has passed through the drying station, conveyor means 32 will transport the vehicle to a second pick-up point 34, to await transport into the polishing station by conveyor means 36.

When polishing station 26 becomes available, control means 70 will cause the vehicle to be polished, positioning the polishing head means in a similar fashion as to that used during the wax application operation. When the vehicle has completed the polishing phase, it is moved from polishing station 26 to the exit point 39 of the automatic vehicle waxer, where the vehicle may be driven to a location for manual touch-up of any areas missed by the automatic waxing process and cleaning of the windows of the vehicle, if necessary.

Although the present invention has been described and illustrated with respect to a preferred embodiment and a preferred use therefor, it is not to be so limited since modifications and changes can be made therein which are within the full intended scope of the invention.

I claim:

1. An automatic vehicle waxer, for applying a hand waxing effect to a vehicle, comprising:
   1. a wax application station, comprising:
      i. a brushless wax application head means for applying wax to the vehicle with a circular orbital motion, and
      ii. a first positioning means for positioning the wax application head means adjacent the surface of the vehicle;
   b. a drying station comprising a blower for drying the wax applied by the wax application head means;
   c. a polishing station, comprising:
      i. a brushless polishing head means for polishing the wax dried by the drying station with a circular orbital motion, and
      ii. a second positioning means for positioning the polishing head means to be adjacent the surface of the vehicle;
   d. a first conveyor means for moving the vehicle through the wax application station to a first pick-up point;
   e. a second conveyor means for moving the vehicle from the first pick-up point, through the drying station to a second pick-up point; and,
   f. a third conveyor means for moving the vehicle from the second pick-up point through the polishing station.

2. The automatic vehicle waxer as described in claim 1, wherein the wax application head means further comprises means for substantially inhibiting application of wax upon non-metallic areas of the vehicle.

3. The automatic vehicle waxer as described in claim 2, wherein the vehicle waxer additionally comprises a control means for controlling the first and second positioning means, and for sequencing the operation of the first, second, and third conveyor means.

4. The automatic vehicle waxer as described in claim 3, wherein the control means is a computer.

5. The automatic vehicle waxer as described in claim 4, wherein the computer comprises storage means containing dimensional parameters of common vehicles, and further comprises selection means for choosing the particular dimensional parameters of the vehicle being waxed from among those of the common vehicles, said particular dimensional parameters determining the controlling of the first and second positioning means.

6. The automatic vehicle waxer as described in claim 5, wherein the first, second, and third conveyor means each further comprise position sensing means for determining the position of the vehicle and for controlling the disengagement of the respective conveyor means from the vehicle.

7. The automatic vehicle waxer as described in claim 6, wherein the wax application station comprises a main frame, and wherein the first and second positioning means each further comprise:
   a. a support frame;
   b. a main pneumatic cylinder means having a first end pivotally connected to the main frame and a second end pivotally connected to the support frame, for extending and retracting the support frame from the main frame;
   c. a first pneumatic rotating cylinder means attached to the main frame and to the first end of the main pneumatic cylinder means for adjusting the angular position of the main pneumatic cylinder means with respect to the main frame;
   d. a second pneumatic rotating cylinder means attached to the support frame and to the second end of the main pneumatic cylinder means for adjusting the angular position of the main pneumatic cylinder means with respect to the support frame; and,
   e. a secondary pneumatic cylinder means mounted on the support frame for positioning the wax application head means adjacent the surface of the vehicle.

8. The automatic vehicle waxer as described in claim 6, wherein the polishing station further comprises a main frame, and wherein the first and second positioning means each further comprise:
   a. a support frame;
   b. a main pneumatic cylinder means having a first end pivotally connected to the main frame and a second end pivotally connected to the support frame, for extending and retracting the support frame from the main frame;
   c. a first pneumatic rotating cylinder means attached to the main frame and to the first end of the main pneumatic cylinder means for adjusting the angular position of the main pneumatic cylinder means with respect to the main frame;
   d. a second pneumatic rotating cylinder means attached to the support frame and to the second end of the main pneumatic cylinder means for adjusting the angular position of the main pneumatic cylinder means with respect to the support frame; and,
   e. a secondary pneumatic cylinder means mounted on the support frame for positioning the respective polishing head means adjacent the surface of the vehicle.

9. An automatic vehicle waxer, for applying a hand waxing effect to a vehicle, comprising:
   a. a wax application station, comprising:

i. a brushless wax application head means for applying wax to the vehicle with a circular orbital motion at a certain pressure against the surface of the vehicle, said certain pressure of said wax application head means being sufficient to apply the wax to the surface of the vehicle but less than that pressure which would damage the finish of the vehicle, and ii. a first positioning means for positioning the wax application head means adjacent the surface of the vehicle;

b. a drying station comprising a blower for drying the wax applied by the wax application head means;

c. a polishing station, comprising:

i. a brushless polishing head means for polishing the wax dried by the drying station with a circular orbital motion at a certain pressure against the surface of the vehicle, said certain pressure of said polishing head means being sufficient to polish the wax dried by the drying station but less than that pressure which would damage the finish of the vehicle, and ii. a second positioning means for positioning the polishing head means to be adjacent the surface of the vehicle;

d. a first conveyor means for moving the vehicle through the wax application station to a first pick-up point;

e. a second conveyor means for moving the vehicle from the first pick-up point, through the drying station to a second pick-up point; and, f. a third conveyor means for moving the vehicle from the second pick-up point through the polishing station.

* * * * *